United States Patent
Arslan et al.

(10) Patent No.: US 11,397,532 B2
(45) Date of Patent: Jul. 26, 2022

(54) DATA STORAGE ACROSS SIMPLIFIED STORAGE VOLUMES

(71) Applicant: Quantum Corporation, San Jose, CA (US)

(72) Inventors: Suayb S. Arslan, Irvine, CA (US); Turguy Goker, Vista, CA (US); Jaewook Lee, Irvine, CA (US)

(73) Assignee: QUANTUM CORPORATION, San Jose, CA (US)

( * ) Notice: Subject to any disclaimer, the term of this patent is extended or adjusted under 35 U.S.C. 154(b) by 12 days.

(21) Appl. No.: 16/653,454

(22) Filed: Oct. 15, 2019

(65) Prior Publication Data

US 2020/0117375 A1    Apr. 16, 2020

Related U.S. Application Data (60) Provisional application No. 62/745,883, filed on Oct. 15, 2018.

(51) Int. Cl.
*G06F 3/06*    (2006.01)

(52) U.S. Cl.
CPC ......... *G06F 3/0631* (2013.01); *G06F 3/0622* (2013.01); *G06F 3/0634* (2013.01); *G06F 3/0683* (2013.01)

(58) Field of Classification Search
CPC .... G06F 3/0631; G06F 3/0683; G06F 3/0622; G06F 3/0634; G06F 3/061; G06F 3/0688; G06F 3/0689
See application file for complete search history.

(56) References Cited

U.S. PATENT DOCUMENTS

| | | | | |
|---|---|---|---|---|
| 3,678,481 A | * | 7/1972 | Dalziel ................. | G11B 5/825 360/78.04 |
| 10,445,229 B1 | * | 10/2019 | Kuzmin ................ | G06F 3/0659 |
| 10,446,186 B1 | * | 10/2019 | Mendonsa ............ | G11B 19/28 |
| 10,698,616 B2 | | 6/2020 | Arslan et al. | |
| 2004/0037202 A1 | * | 2/2004 | Brommer ............... | G11B 5/488 369/94 |
| 2008/0005384 A1 | | 1/2008 | Mead et al. | |
| 2013/0282953 A1 | | 10/2013 | Orme et al. | |
| 2014/0344645 A1 | | 11/2014 | Gladwin et al. | |
| 2015/0055243 A1 | * | 2/2015 | Ehrlich .................. | G11B 19/06 360/69 |

(Continued)

*Primary Examiner* — Ramon A. Mercado
(74) *Attorney, Agent, or Firm* — Roeder & Broder LLP; James P. Broder (57) ABSTRACT

The technology described herein enables data storage across storage volumes having fewer features than the storage volumes otherwise would. In one example, a method includes, in a data access system, identifying first data for storage on physical storage volumes. Each of the physical storage volumes corresponds to respective ones of data channels and control channels. The method further includes segmenting the first data into data segments corresponding to respective ones of the data channels and transferring the data segments as respective bit streams over the respective ones of the data channels to the respective ones of the physical storage volumes. The method also includes providing real-time write control to the physical storage volumes over respective ones of the control channels. The real-time write control directs a process for how the physical storage volumes write the data segments.

20 Claims, 7 Drawing Sheets

(56) References Cited

U.S. PATENT DOCUMENTS

| | | |
|---|---|---|
| 2016/0092305 A1 | 3/2016 | Alam et al. |
| 2016/0179422 A1* | 6/2016 | Lee .................. G06F 11/108 |
| | | 711/103 |
| 2017/0286223 A1 | 10/2017 | Baptist et al. |
| 2018/0032432 A1* | 2/2018 | Kowles ............... G06F 3/0679 |
| 2018/0196611 A1* | 7/2018 | Wei .................. G06F 3/0658 |
| 2019/0012236 A1* | 1/2019 | Hitron ................ G06F 3/0683 |

* cited by examiner

DATA STORAGE ACROSS SIMPLIFIED STORAGE VOLUMES

RELATED APPLICATIONS

This application is related to and claims priority to U.S. Provisional Patent Application 62/745,883, titled "DATA STORAGE ACROSS SIMPLIFIED HDD AND SSD STORAGE DEVICES," filed Oct. 15, 2018, and which is hereby incorporated by reference in its entirety.

TECHNICAL BACKGROUND

Current large scale (for the most part) data storage systems use storage volumes, most commonly hard disk drives (HDDs), on a standalone basis. That is, when data is transferred to one of the storage volumes, the storage volume processes the received data for storage in the same manner it would if it was a volume on, for instance, a personal computer. For example, the storage volume may perform a data protection process on the data, which decreases the probability that the data will be lost or otherwise corrupted. Even when individual storage volumes are combined together in a storage system, such as those systems using technologies like redundant array of independent disks (RAID), the storage volumes themselves do not physically change. The storage volumes continue to include the same features as those storage volumes require when operating independently of any other volumes (i.e., will still include data processing circuitry, drive motors, data transfer interfaces, etc.). Those additional features all entail additional monetary cost for their inclusion in the storage volumes. Even if the additional monetary cost is relatively low on a per volume basis, the costs add up quickly in a storage system having many of those storage volumes. Likewise, the more features an individual storage volume has, the greater the chances that one of those features will cause the storage volume to fail.

Overview

The technology described herein enables data storage across storage volumes having fewer features than the storage volumes otherwise would. In one example, a method includes, in a data access system, identifying first data for storage on the plurality of physical storage volumes. Each of the plurality of physical storage volumes corresponds to respective ones of a plurality of data channels and a plurality of control channels. The method further includes segmenting the first data into a plurality of data segments corresponding to respective ones of the plurality of data channels and transferring the plurality of data segments as respective bit streams over the respective ones of the plurality of data channels to the respective ones of the plurality of physical storage volumes. The method also includes providing real-time write control to the plurality of physical storage volumes over respective ones of the plurality of control channels. The real-time write control directs a process for how the plurality of physical storage volumes write the plurality of data segments.

In some embodiments, the plurality of physical storage volumes comprises a plurality of hard disk drives and the real-time write control includes signaling for controlling a disk rotation motor and a head position motor in each of the plurality of hard disk drives.

In some embodiments, the plurality of physical storage volumes comprises a plurality of hard disk drives without disk rotation motors, the data access system includes at least one disk rotation motor for rotating disks in the plurality of hard disk drives, and providing the real-time write control comprises controlling operation of the disk rotation motor. In those embodiments, the plurality of physical storage volumes may comprise a plurality of hard disk drives without head position motors, the data access system may include at least one head position motor for positioning heads in the plurality of hard disk drives, and providing the real-time write control may include controlling operation of the head position motor. Additionally, in those embodiments, the plurality of physical storage volumes may include a plurality of hard disk drives without heads and the data access system may include at least one head, coupled to the head position motor, for writing data to the plurality of hard disk drives.

In some embodiments, the plurality of physical storage volumes comprises a plurality of flash memory boards and the real-time write control includes flash memory control signaling for flash memory modules in the plurality of flash memory boards. In those embodiments, the memory control signaling accounts for wear leveling of the flash memory modules and bad block mapping of the flash memory modules when directing where to store the plurality of data segments in the flash memory modules. In those embodiments, the method further includes performing garbage collection for the flash memory modules.

In some embodiments, segmenting the first data into the plurality of data segments comprises performing a data protection process on the first data that results in the plurality of data segments.

In another embodiment, a data access system is provided having processing circuitry configured to identify first data for storage on the plurality of physical storage volumes. Each of the plurality of physical storage volumes corresponds to respective ones of a plurality of data channels and a plurality of control channels. The processing circuitry is further configured to segment the first data into a plurality of data segments corresponding to respective ones of the plurality of data channels and transfer the plurality of data segments as respective bit streams over the respective ones of the plurality of data channels to the respective ones of the plurality of physical storage volumes. The processing circuitry is also configured to provide real-time write control to the plurality of physical storage volumes over respective ones of the plurality of control channels. The real-time write control directs a process for how the plurality of physical storage volumes write the plurality of data segments.

In yet another embodiment, one or more computer readable storage media is provided having program instructions stored thereon that, when read and executed by a processing system, direct the processing system to identify first data for storage on the plurality of physical storage volumes. Each of the plurality of physical storage volumes corresponds to respective ones of a plurality of data channels and a plurality of control channels. The program instructions further direct the processing system to segment the first data into a plurality of data segments corresponding to respective ones of the plurality of data channels and transfer the plurality of data segments as respective bit streams over the respective ones of the plurality of data channels to the respective ones of the plurality of physical storage volumes. The program instructions also direct the processing system to provide real-time write control to the plurality of physical storage volumes over respective ones of the plurality of control channels. The real-time write control directs a process for how the plurality of physical storage volumes write the plurality of data segments.

DETAILED DESCRIPTION

The examples herein describe how simplified physical storage volumes, such as hard disk drives or flash memory boards, may be used to more cost effectively implement a storage system. In particular, moving functions off of the physical storage volume itself should allow for the storage volume to be produced for lower monetary cost than had the functions been included. While the data access system used to read from and write data to those simplified storage volumes may become marginally more expensive to produce, over time that additional cost should be offset with the cost savings of using simplified storage volumes in place of traditional storage volumes. In addition to potential cost savings, the data access system and storage volumes described below decomposes what would otherwise be tightly packed components on the storage volumes themselves, which enables improved access performance of the storage volumes. The improved storage volume access performance typically also improves the performance of processes that use the storage volumes, such as virtualized processes running off of, or otherwise, accessing the storage volumes.

Figure 1:
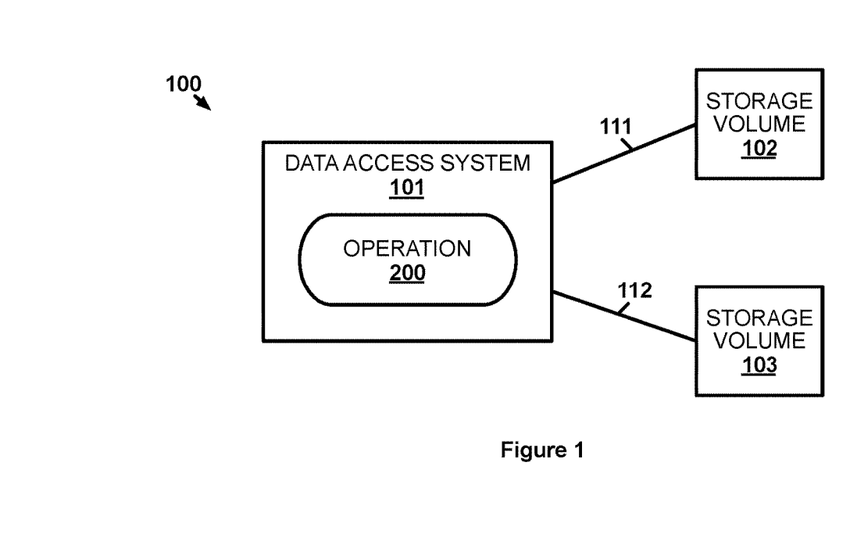
FIG. 1 illustrates a data storage environment for storing data across simplified storage volumes.

FIG. 1 illustrates data storage environment 100 for storing data across simplified storage volumes. Data storage environment 100 includes data access system 101, physical data storage volume 102, and physical data storage volume 103. Data access system 101 and data storage volume 102 communicate over communication link(s) 111. Data access system 101 and data storage volume 103 communicate over communication link(s) 112.

In operation, data access system 101 performs operations, including operation 200, that control the access of data stored on physical storage volumes. Data storage environment 100 only includes two physical data storage volumes 102 and 103, however, it should be understood that data storage environment 100 may include any number of physical data storage volumes. The number of data storage volumes connected to data access system 101 at any given time is only limited by the number of data channels available to the data access system 101. Moreover, in some examples, additional storage volumes may be available for connection to data access system 101 in place of data storage volume 102 and data storage volume 103. For instance, data access system 101 may be included in a storage library where data storage volumes can be swapped out (e.g., by robotic movement devices) for access by data access system 101. In this example, data storage volume 102 and data storage volume 103 do not include (or at least do not use) circuitry for performing data processing (e.g., error correction, encryption, etc.) or for directing a process that stores data. The process that stores data in a hard drive, for example, directs a motor for spinning the disk platters therein and the motion of an arm for magnetic access head(s) so that data can be written to or read from the correct physical location on the platters. The process may further direct which head should write/read data in accordance with which disk platter, and which side of the disk platter, the data is or is to be located. In the case of flash memory modules (or some other type of solid state memory) being one or more of the data storage volumes, the process would determine locations within the flash memory modules to which data should be written or from which data should be read. The process further may account for wear leveling, bad block mapping, and perform garbage collection on the flash memory modules.

Figure 2:
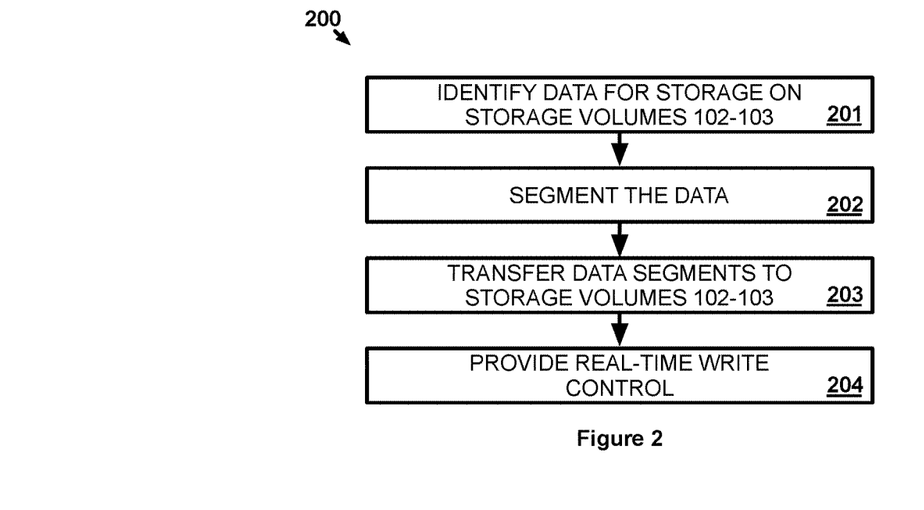
FIG. 2 illustrates an operation for storing data across simplified storage volumes.

FIG. 2 illustrates operation 200 for storing data across simplified storage volumes. In operation 200, data access system 101 identifies data for storage on data storage volume 102 and data storage volume 103 (201). Data storage volume 102 and data storage volume 103 each correspond to respective data channels and control channels with data access system 101. The respective data and control channels may share the same physical communication link (e.g., communication link 111, as shown in data storage environment 100) or may be separated into separate links. The data channels may be serial data channels, such as serial advanced technology attachment (SATA) channels, or may use some other type of data transport interface. The control channels may include channels similar to the data channels for transferring digital signaling and/or may include analog signaling (e.g., motor control signal). In some examples, a control channel may include mechanical connections, such as the motor connections shown in data storage environment 500. The data to be stored may be identified by being received from another computing system, which may be coupled to data access system 101 over a communication network, may be identified from a user instruction into data access system 101, either directly into a user interface or via another computing system in communication with data access system 101, may be identified from data already stored within data access system 101, or may be identified in some other manner.

Data access system 101 segments the data into data segments corresponding to respective ones of the data channels (202). Since each data channel corresponds to one of physical data storage volumes 102 and 103, the segments also correspond to respective ones of data storage volumes 102 and 103. Data access system 101 may separate the data into segments using any scheme, however, the data is preferably separated as part of processing to protect the data for the purposes of error correction or storage volume failure recovery. For example, data writing system may put the data through erasure coding in which the data is segmented, expanded, and encoded with redundant data pieces. The erasure coded data can be recovered even when an entire segment cannot be retrieved when being read (e.g., when the data storage volume storing that segment fails). Alternative and/or additional forms of data protection may be used by data access system 101 in other examples. The resultant segments are then divided among data storage volumes 102 and 103.

Data access system 101 transfers the data segments as respective bit streams over the respective data channels to the respective ones of data storage volume 102 and data storage volume 103 (203). Data access system 101 also provides real-time write control to data storage volume 102 and data storage volume 103 over respective ones of the control channels (204). The real-time write control directs a process for how the data storage volume 102 and data storage volume 103 write the data segments in real-time since the circuitry that would otherwise control the write process is not included, or otherwise not operational, on data storage volume 102 and data storage volume 103. The process is dependent upon the type of storage volume upon which the data is being stored. As mentioned above, directing the process for writing data to a hard disk drive may include directing disk and access head motors and selecting an access head to be used for writing a data segment. Likewise, the process for writing data to flash memory modules may include directing the data segment to a location within the memory modules that accounts for wear management and bad blocks. The real-time aspect of the control refers to the fact that the control must synchronize with the data being written. For example, when a particular bit is being written by a hard drive, the control provided by data access system 101 needs to ensure that the disk platters are spinning and the write head is in the correct position so that, when the access head is magnetized to write the bit, the access head is over the correct position on a disk platter for that bit. In some examples, data access system 101 may need to buffer the data segments to ensure the data is synchronized with the control provided. In some of those examples, the buffer may be included on the storage volume itself so that latency of the data or control channels does not affect the synchronization of the data being written and the control for writing that data.

While operation 200 focuses on the writing of data, a similar process occurs when data access system 101 reads data from data storage volume 102 and data storage volume 103. To read data, data access system 101 identifies data to be read from data storage volume 102 and data storage volume 103. The data was stored via operation 200, which allows data access system 101 to essentially perform operation 200 in the opposite direction. Data access system 101 may receive input from a user or a request from another system that requests the data. Data access system 101 provides real-time control to data storage volume 102 and data storage volume 103 to read segments of the data from data storage volume 102 and data storage volume 103. For example, the real-time control may direct an access head of a hard drive is properly positioned over a spinning platter of a hard drive to read bits comprising a data segment of the data which is then transferred over the data channel to data access system 101. Similarly, data access system 101 may control where data from flash memory modules is retrieved to obtain a data segment for transfer over the data channel to data access system 101. Upon receiving the data segments from data storage volume 102 and data storage volume 103, data access system 101 reverses the process used to segment the data (i.e., step 202) to restore the requested data from the data segments.

Figure 3:
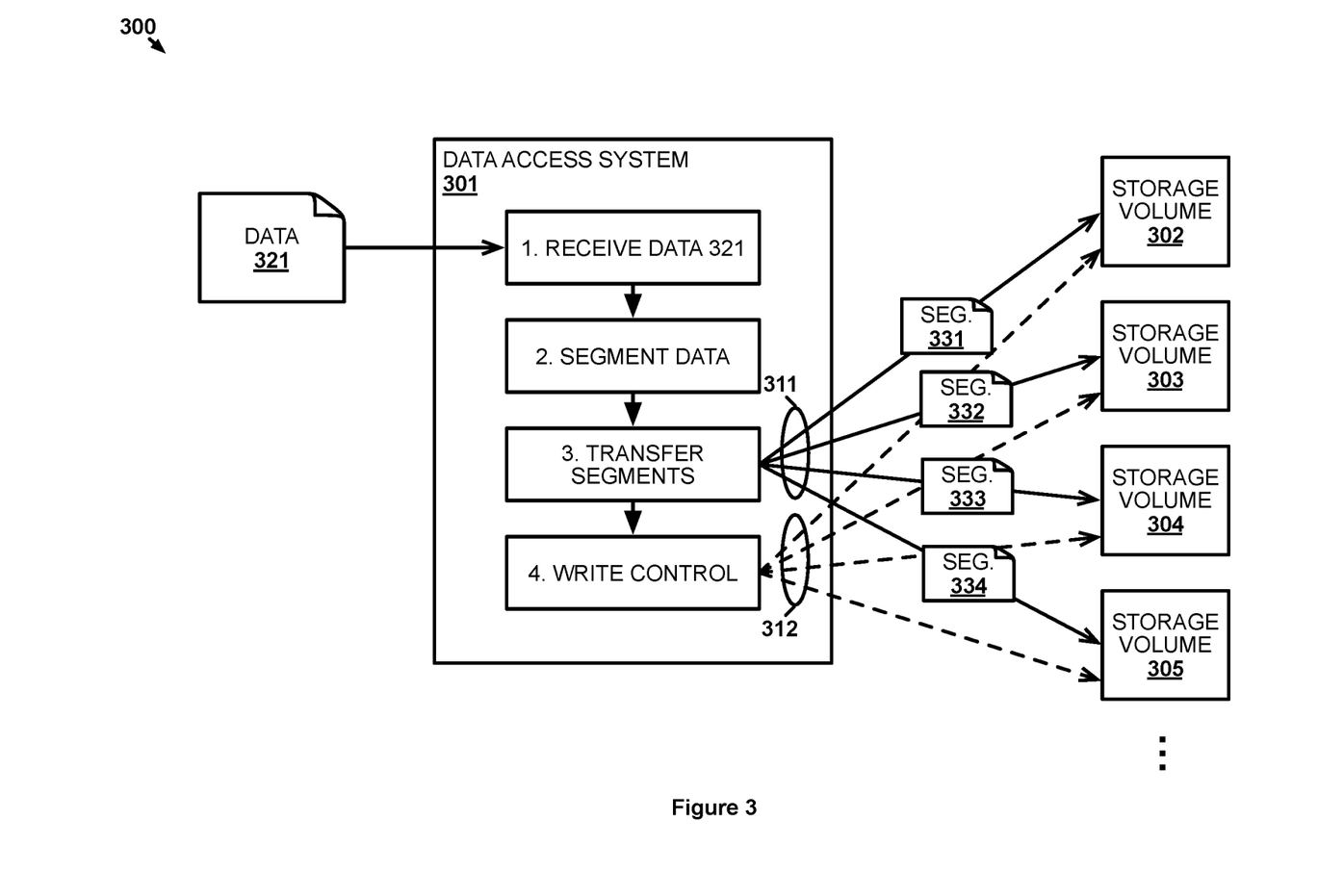
FIG. 3 illustrates an operational scenario for storing data across simplified storage volumes.

FIG. 3 illustrates operational scenario 300 for storing data across simplified storage volumes. Operational scenario 300 shows data access system 301, storage volume 302, storage volume 303, storage volume 304, and storage volume 305. Storage volumes 302-305 include physical storage volumes, such as hard disk drives and/or flash memory boards. Though not shown, operational scenario 300 may include additional physical storage volumes across which data segments will be stored, which depends on the number of data channels available to data access system 301.

In operational scenario 300, data access system 301 receives data 321 at step 1 for storage on storage volumes 302-305. Data 321 may be received over a communication network from another computing system or may be received in some other manner. Data access system 301 protects data 321 at step 2, which results in data segment 331, data segment 332, data segment 333, and data segment 334. In some examples, data access system 301 may perform additional processing of data 321 at step 2, such as deduplicating and/or compressing data 321. Data access system 301 transfers data segments 331-334 to respective storage volumes 302-305 over respective data channels 311 at step 3 and provides write control to respective storage volumes 302-305 over respective control channels 312. Steps 3 and 4 occur at substantially the same time to ensure the write control provided over control channels 312 is synchronized with data segments 331-334 being transferred over data channels 311. That is, storage volumes 302-305 are each controlled by data access system 301 so that the bits of data segments 331-334 end up in the proper locations on storage volumes 302-305. Since data 321 may be large, it is possible that steps 1-4 occur continually for portions of data 321. As more of data 321 is received, that portion is segmented and the bits of those segments are streamed to storage volumes 302-305 and storage volumes 302-305 are controlled to store those bits while additional portions of data 321 are still being received by data access system 301.

Figure 4:
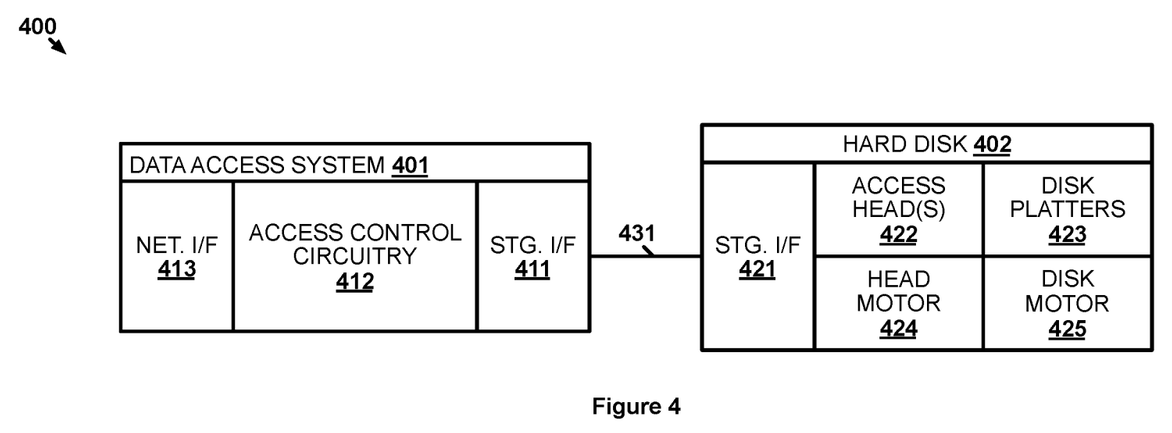
FIG. 4 illustrates a data storage environment for storing data across simplified storage volumes.

FIG. 4 illustrates data storage environment 400 for storing data across simplified storage volumes. Data storage environment 400 includes data access system 401 and hard disk 402. In this example, data access system 401 includes network interface 413, access control circuitry 412, and storage interface 411. Hard disk 402 includes storage interface 421, data access head(s) 422, disk platters 423, access head motor 424, and disk motor 425. Storage link 431 comprises a physical link that connects storage interface 411 and storage interface 421. In other examples, multiple physical links may connected storage interface 411 and storage interface 421, such as one link for data transfer and one link for control transfer. Hard disk 402 is one of many hard disks connected to data access system 401 via storage interface 411. For example, data access system 401 may be an example of data access system 301 and hard disk 402 may be one of storage volumes 302-305. Though not shown, the other hard disks would include similar components and perform similarly to hard disk 402 described below.

In this example, network interface 413 includes circuitry data access system 401 to receive data for storage, at least in part, on hard disk 402 over a communication network, such as a local area network and/or the internet. Access control circuitry 412 includes processing circuitry that performs at least a data protection process on data received by data access system 401. The data protection process segments the data into respective segments for storage on the hard disks connected to storage interface 411, including hard disk 402. Access control circuitry 412 may comprise one or more application specific integrated circuits (ASICs) for performing functions described below, may comprise one or more processors executing program instructions to perform the functions described below, or may comprise some combination of the two (e.g., program instructions and a processor for running general functions of data access system 401 and ASICs for performing data protection and hard disk control).

Storage interface 421 converts the bits representing a data segment that are received over storage link 431 to electrical signals that, when applied to one of data access head(s) 422, cause the one of data access head(s) 422 to write the bits to one of disk platters 423. Storage interface 421 further receives control signaling and interprets the control instructions from access control circuitry 412 that are included in that control signaling. In this case, the control signaling indicates a one of data access head(s) 422 that should write the received data segment, a positioning of data access head(s) 422, and that disk motor 425 should spin up disk platters 423 if they are not already spinning. Since the position of data access head(s) 422 will change as the data segment is being written, the control signaling directs the position of data access head(s) 422 to change as the data segment is being written to ensure all bits of the data segment are written to the proper location on hard disk 402.

Figure 5:
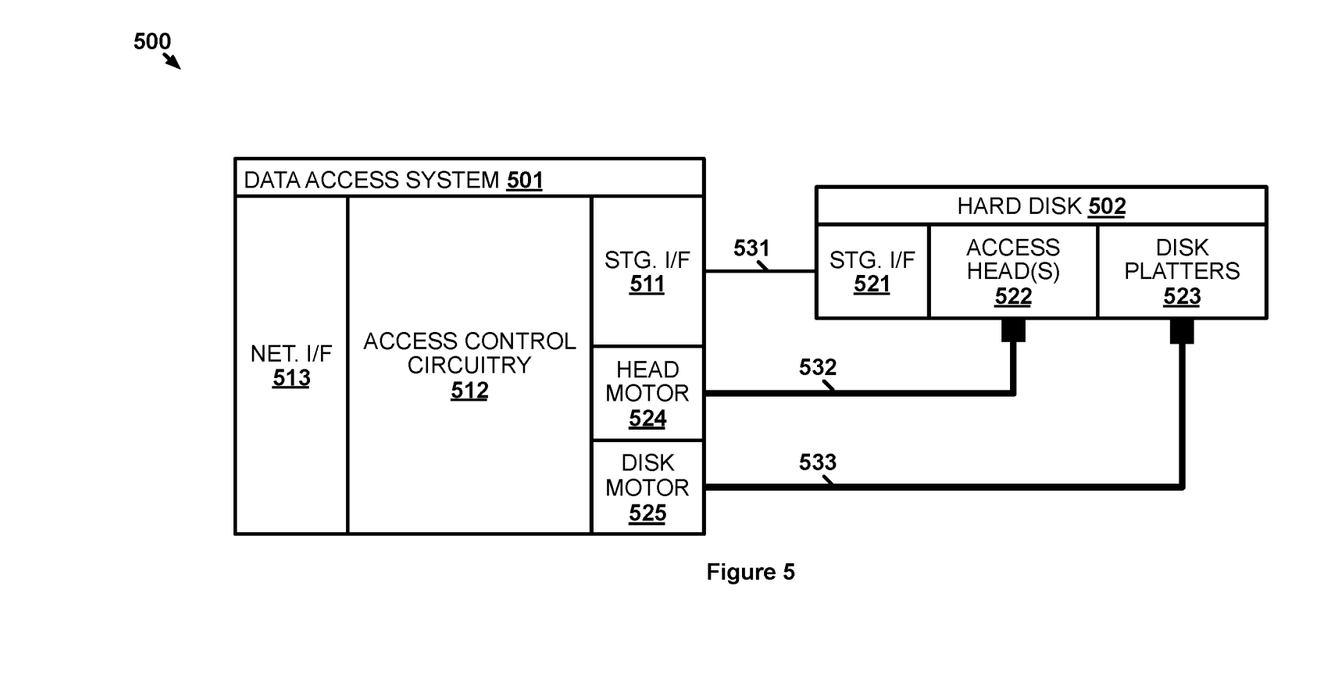
FIG. 5 illustrates a data storage environment for storing data across simplified storage volumes.

FIG. 5 illustrates data storage environment 500 for storing data across simplified storage volumes. Data storage environment 500 includes data access system 501 and hard disk 502, which is one of many hard disks connected to data access system 501 similar to hard disk 402 above. Data access system 501 includes network interface 513, access control circuitry 512, and storage interface 511, which are all similar to corresponding elements in data access system 401. Hard disk 502 includes storage interface 521, data access head(s) 522, and disk platters 523, which are all similar to corresponding elements in data access system 401. In this example, data access system 501 further includes access head motor 524 and disk motor 525 rather than those elements being within hard disk 502. Mechanical connection 532 connects access head motor 524 to data access head(s) 522 to move data access head(s) 522 within hard disk 502. Likewise, disk motor 525 connects disk motor 525 and disk platters 523 to spin disk platters 523 in hard disk 502. Mechanical connection 532 and mechanical connection 533 may be drive shafts, gears, belts, or some other mechanical means for transferring mechanical energy.

While shown as a single device, data access system 501 may be separated into multiple devices. For example, storage interface 511, access head motor 524, and disk motor 525 may be part of an access drive device connected to access control circuitry 512 and into which hard disk 502 is inserted for access by data access system 501. An electrical or optical connector may complete storage link 531 when hard disk 502 is inserted and mechanical interfaces may complete the connections of mechanical connection 532 and mechanical connection 533 to hard disk 502. While this example shows both access head motor 524 and disk motor 525 as being included in data access system 501, other examples may only include one of access head motor 524 and disk motor 525 in data access system 501.

Storage interface 521 converts the bits representing a data segment that are received over storage link 431 to electrical signals that, when applied to one or more of data access head(s) 522, cause the one or more of data access head(s) 522 to write the bits to one of disk platters 523. Storage interface 521 further receives control signaling and interprets the control instructions from access control circuitry 512 that are included in that control signaling. In this case, the control signaling indicates a one of data access head(s) 422 that should write the received data segment. The control signaling received through storage interface 521 does not need to control the positioning of data access head(s) 522 or the spinning of disk platters 523, as did the control signaling in data storage environment 400. Instead, access control circuitry 512 controls access head motor 524 and disk motor 525 which allows data access system 501 to mechanically control the positioning of data access head(s) 522 and the spinning of disk platters 523. Access head motor 524 is controlled to position data access head(s) 522 such that the bits of the data segment being stored are written to the proper location on hard disk 502.

In some examples, access head motor 524 and disk motor 525 may be used to control only one hard disk, such as hard disk 502. In other examples, mechanical connections may branch off of either or both of access head motor 524 and disk motor 525 so that more than one hard disk can be controlled using fewer motors. In those examples, if the data segments that are being stored across multiple hard drives are of the same size, then the spin of the hard disk platters and the positioning of the access heads in each hard disk can be synchronized (due to their connections to the same motors) so that corresponding data segments are stored in the same positions across all hard disks.

Figure 6:
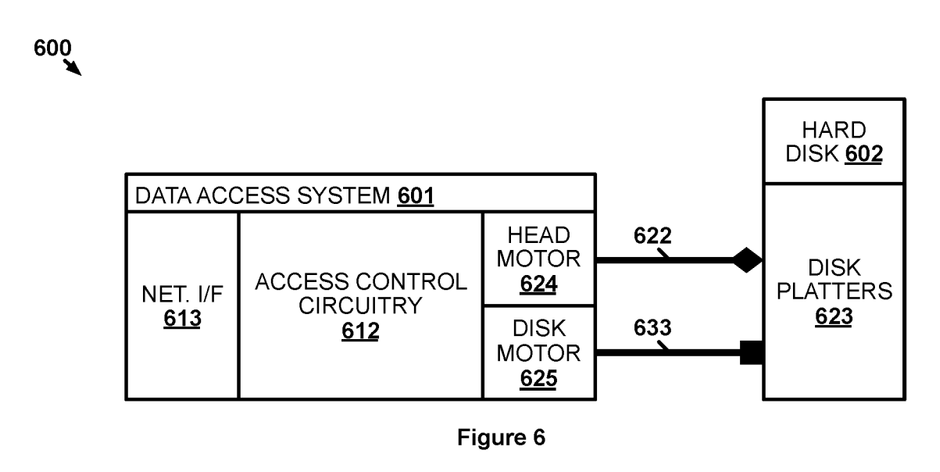
FIG. 6 illustrates a data storage environment for storing data across simplified storage volumes.

FIG. 6 illustrates data storage environment 600 for storing data across simplified storage volumes. Data storage environment 600 goes a step further than data storage environment 500 in that data access system 601 also includes data access head(s) 622 in addition to access head motor 624 and disk motor 625. Data access system 601 further includes access control circuitry 612 and network interface 613 like data access system 401 and data access system 501. Data access system 601 does not include (or at least does not use) a storage interface in this example because hard disk 602 includes only disk platters 623 and has no corresponding storage interface with which data access system 601 can communicate. Since hard disk 602 is one of many hard disks like hard disk 402 and hard disk 502, data access system 601 includes other access heads in addition to data access head(s) 622. Each of those other access heads may have their own motor or may all be moved by access head motor 624. Likewise, the other hard disks may have their own disk motors or may all be spun by disk motor 625 via a mechanical connection similar to mechanical connection 633.

Similar to hard disk 502, hard disk 602 may contain disk platters 623 in a cartridge that exposes disk platters 623 to data access head(s) 622 when inserted into an access drive device containing data access head(s) 622. The cartridge and the access drive are preferably sealed against dust infiltration which could inhibit the proper operation of data access head(s) 622. While not shown, a storage interface may exist between data access system 601 and the access drive (and other access drives for the other hard disks), although those access drives are considered part of data access system 601. In operation, a data segment generated by access control circuitry 612 is converted to the electrical signals necessary for writing the data segment through data access head(s) 622 and data access head(s) 622 directs those electrical signals through the appropriate access head to write the data segment in the desired location on disk platters 623. Of course, access control circuitry 612 also controls access head motor 624 and disk motor 625 to ensure the data segment is written to the desired location.

Figure 7:
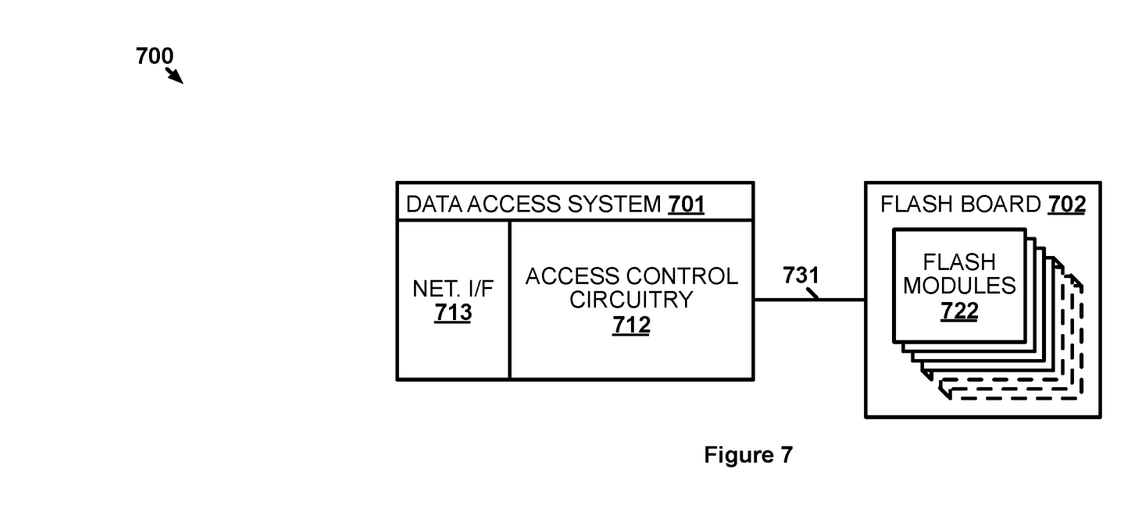
FIG. 7 illustrates a data storage environment for storing data across simplified storage volumes.

FIG. 7 illustrates data storage environment 700 for storing data across simplified storage volumes. Data storage environment 700 includes data access system 701 and flash board 702. In this example, data access system 701 includes network interface 713 and access control circuitry 712. Flash board 702 includes one or more flash modules 722 to which data is stored. Access control circuitry 712 and flash board 702 communicate over storage link 731. Since neither data access system 701 nor flash board 702 include a storage interface, storage link 731 may be a bus type interface between flash board 702 and a board having access control circuitry 712. Alternative examples may include storage interfaces similar to those discussed above.

Like the hard disks in the examples above, flash board 702 is one of many flash memory boards to which data segments of data received via network interface 713 is stored. Also like the examples above, data access system 701 may be an example of data access system 301 and flash board 702 may be one of storage volumes 302-305. Though not shown, the other flash memory boards would include similar components and perform similarly to flash board 702 described below. Flash board 702 (and the other flash boards) may be a removable board that can be relatively easily swapped out (e.g., manually by a user or using an automated library mechanism) or may be permanently (or semi-permanently) attached to data access system 701.

In operation, access control circuitry 712 receives data via network interface 713. Access control circuitry 712 segments the data and transfers the respective data segments to flash memory boards, including flash board 702. In this case, since flash board 702 does not have its own controller, access control circuitry 712 controls where the data segment intended for flash board 702 will be stored. In particular, access control circuitry 712 controls storage link 731 to transfer the data segment to the desired location for the data segment on flash board 702. Access control circuitry 712 may select the desired location by selecting a flash module (or modules) of flash modules 722 and a location within the flash module. Access control circuitry 712 may account for bad blocks and wear leveling in flash modules 722 when determining the location. Also, access control circuitry 712 may use network interface 713 to perform ancillary tasks on flash board 702, such as performing garbage collection.

In the above examples of data storage environments 400-700, the hard disks/flash boards are one of multiple hard disks/flash boards to which segments of data received over the data access system's network interfaces are stored. As such, if the hard disks/flash boards are removable, then all hard disks/flash boards used to store the data will need to be attached to the data access system in order to read and restore the data from its segments. For example, the data may be segmented into 16 segments across 16 corresponding hard disks that are later swapped out for 16 different hard disks. When the data needs to be read, those original 16 hard disks need to be swapped back in so that the data access system can control the hard disks (like it did when writing the data segments) to read the data segments therefrom and recover the original data. When reading data, the access control circuitry discussed above simply controls the hard disks/flash boards to retrieve the data segments from their locations thereon and reverses the segmentation process (e.g., reverses the erasure coding) to restore the original data.

In some examples, a data access system may be able to store data on hard disks or flash boards. As such, the access control circuitry thereon is capable of controlling both hard disks and flash boards. For instance, data that may need to be accessed more frequently may be stored on flash boards for faster access while data that will likely be accessed less frequently may be stored on hard disks. Also, though not discussed above, the data access system may also be able to store data to magnetic tape. Data that is likely to be accessed even less frequently than that stored on hard disks may be stored on magnetic tape. Although, since magnetic tape has multiple tracks, the data segments may simply be stored on different tracks of the same tape rather than on different tapes, as the data segments above are stored on different hard disks or flash boards.

Figure 8:
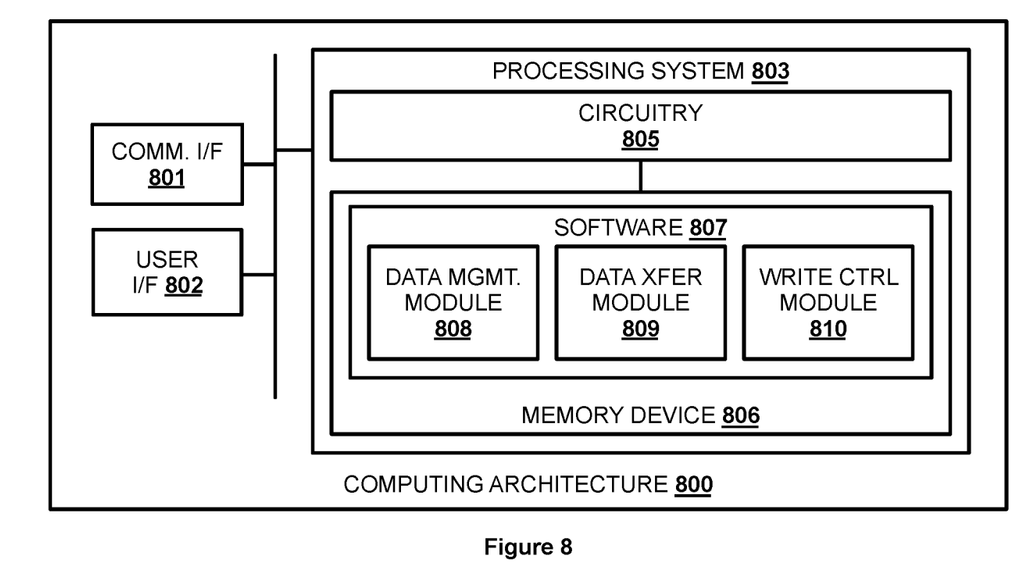
FIG. 8 illustrates a computing architecture for storing data across simplified storage volumes.

FIG. 8 illustrates computing architecture 800 for storing data across simplified storage volumes. Computing architecture 800 is an example of data access system 101, although system 101 may use alternative configurations, such as that shown for data access system 401. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, SATA, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer-readable storage medium, such as a disk drive, flash drive, data storage circuitry, or some other memory apparatus. In no examples would the computer readable storage medium of memory device 806 be considered a propagated signal. Operating software 807 comprises computer programs, firmware, or some other form of computer-readable program instructions. Operating software 807 includes data management module 808, data transfer module 809, and write control module 810. Operating software 807 may further include an operating system, utilities, drivers, network interfaces, applications, or some other type of software. When executed by circuitry 805, operating software 807 directs processing system 803 to operate computing architecture 800 as described herein.

In particular, data management module 808 directs processing system 803 to identify first data for storage on the plurality of physical storage volumes. Each of the plurality of physical storage volumes corresponds to respective ones of a plurality of data channels and a plurality of control channels. Data management module 808 further directs processing system 803 to segment the first data into a plurality of data segments corresponding to respective ones of the plurality of data channels. Data transfer module 809 directs processing system 803 to transfer the plurality of data segments as respective bit streams over the respective ones of the plurality of data channels to the respective ones of the plurality of physical storage volumes. Write control module 810 directs processing system 803 to provide real-time write control to the plurality of physical storage volumes over respective ones of the plurality of control channels. The real-time write control directs a process for how the plurality of physical storage volumes write the plurality of data segments.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of operating a data access system for storing data to a plurality of physical storage volumes, the method comprising:
in the data access system:
identifying first data for storage on the plurality of physical storage volumes, wherein each of the plurality of physical storage volumes corresponds to respective ones of a plurality of data channels and a plurality of control channels;
segmenting the first data into a plurality of data segments corresponding to respective ones of the plurality of data channels;
transferring the plurality of data segments as respective bit streams over the respective ones of the plurality of data channels to the respective ones of the plurality of physical storage volumes; and
providing real-time write control to the plurality of physical storage volumes over respective ones of the plurality of control channels, wherein the real-time write control directs a process for how the plurality of physical storage volumes write the plurality of data segments;
wherein the plurality of physical storage volumes includes a plurality of hard disk drives without disk rotation motors, wherein the data access system includes at least one disk rotation motor for rotating disks in the plurality of hard disk drives, and wherein providing the real-time write control includes controlling operation of the disk rotation motor;
wherein the plurality of physical storage volumes includes a plurality of hard disk drives without head position motors, wherein the data access system includes at least one head position motor for positioning heads in the plurality of hard disk drives, and wherein providing the real-time write control includes controlling operation of the head position motor; and
wherein the plurality of physical storage volumes includes a plurality of hard disk drives without heads and wherein the data access system includes at least one head, coupled to the head position motor, for writing data to the plurality of hard disk drives.

2. The method of claim 1, wherein the plurality of physical storage volumes further includes a plurality of hard disk drives and wherein the real-time write control includes signaling for controlling a disk rotation motor and a head position motor in each of the plurality of hard disk drives.

3. The method of claim 1, wherein segmenting the first data into the plurality of data segments comprises:
performing a data protection process on the first data that results in the plurality of data segments.

4. A data access system for storing data to a plurality of physical storage volumes, the data access system comprising:
processing circuitry configured to:
identify first data for storage on the plurality of physical storage volumes, wherein each of the plurality of physical storage volumes corresponds to respective ones of a plurality of data channels and a plurality of control channels;
segment the first data into a plurality of data segments corresponding to respective ones of the plurality of data channels;
transfer the plurality of data segments as respective bit streams over the respective ones of the plurality of data channels to the respective ones of the plurality of physical storage volumes; and
provide real-time write control to the plurality of physical storage volumes over respective ones of the plurality of control channels, wherein the real-time write control directs a process for how the plurality of physical storage volumes write the plurality of data segments;
wherein the plurality of physical storage volumes includes a plurality of hard disk drives without disk rotation motors, wherein the data access system includes at least one disk rotation motor for rotating disks in the plurality of hard disk drives, and wherein the processing circuitry configured to provide the real-time write control includes the processing circuitry configured to control operation of the disk rotation motor;
wherein the plurality of physical storage volumes includes a plurality of hard disk drives without head position motors, wherein the data access system includes at least one head position motor for positioning heads in the plurality of hard disk drives, and wherein the processing circuitry configured to provide the real-time write control includes the processing circuitry configured to control operation of the head position motor; and
wherein the plurality of physical storage volumes includes a plurality of hard disk drives without heads and wherein the data access system includes at least one head, coupled to the head position motor, for writing data to the plurality of hard disk drives.

5. The data access system of claim 4, wherein the plurality of physical storage volumes further includes a plurality of hard disk drives and wherein the real-time write control includes signaling for controlling a disk rotation motor and a head position motor in each of the plurality of hard disk drives.

6. The data access system of claim 4, wherein segmenting the first data into the plurality of data segments comprises:
performing a data protection process on the first data that results in the plurality of data segments.

7. One or more computer readable storage media having program instructions stored thereon for operating a data access system, the program instructions, when read and executed by a processing system, direct the processing system to:
identify first data for storage on a plurality of physical storage volumes, wherein each of the plurality of physical storage volumes corresponds to respective ones of a plurality of data channels and a plurality of control channels;
segment the first data into a plurality of data segments corresponding to respective ones of the plurality of data channels;
transfer the plurality of data segments as respective bit streams over the respective ones of the plurality of data channels to the respective ones of the plurality of physical storage volumes; and
provide real-time write control to the plurality of physical storage volumes over respective ones of the plurality of control channels, wherein the real-time write control directs a process for how the plurality of physical storage volumes write the plurality of data segments;

wherein the plurality of physical storage volumes includes a plurality of hard disk drives without heads; and wherein the data access system includes a head position motor, and at least one head that is coupled to the head position motor and that is configured for writing data to the plurality of hard disk drives.

8. The one or more computer readable storage media of claim 7, wherein the plurality of physical storage volumes comprises further includes a plurality of hard disk drives and wherein the real-time write control includes signaling for controlling a disk rotation motor and a head position motor in each of the plurality of hard disk drives.

9. The one or more computer readable storage media of claim 7, wherein the plurality of physical storage volumes further includes a plurality of hard disk drives without disk rotation motors, wherein the data access system includes at least one disk rotation motor for rotating disks in the plurality of hard disk drives, and wherein providing the real-time write control includes controlling operation of the disk rotation motor.

10. The one or more computer readable storage media of claim 7, wherein the plurality of physical storage volumes further includes a plurality of hard disk drives without head position motors, wherein the data access system includes at least one head position motor for positioning heads in the plurality of hard disk drives, and wherein providing the real-time write control includes controlling operation of the head position motor.

11. A method of operating a data access system for storing data to a plurality of physical storage volumes, the method comprising:

in the data access system:

identifying first data for storage on the plurality of physical storage volumes, wherein each of the plurality of physical storage volumes corresponds to respective ones of a plurality of data channels and a plurality of control channels;

segmenting the first data into a plurality of data segments corresponding to respective ones of the plurality of data channels;

transferring the plurality of data segments as respective bit streams over the respective ones of the plurality of data channels to the respective ones of the plurality of physical storage volumes; and providing real-time write control to the plurality of physical storage volumes over respective ones of the plurality of control channels, wherein the real-time write control directs a process for how the plurality of physical storage volumes write the plurality of data segments;

wherein the plurality of physical storage volumes includes a plurality of hard disk drives without heads; and wherein the data access system includes a head position motor, and at least one head that is coupled to the head position motor and that is configured for writing data to the plurality of hard disk drives.

12. The method of claim 11, wherein the plurality of physical storage volumes further includes a plurality of hard disk drives and wherein the real-time write control includes signaling for controlling a disk rotation motor and a head position motor in each of the plurality of hard disk drives.

13. The method of claim 11, wherein segmenting the first data into the plurality of data segments includes performing a data protection process on the first data that results in the plurality of data segments.

14. The method of claim 13, wherein the plurality of physical storage volumes comprises a plurality of hard disk drives without disk rotation motors, wherein the data access system includes at least one disk rotation motor for rotating disks in the plurality of hard disk drives, and wherein providing the real-time write control comprising:

controlling operation of the disk rotation motor.

15. The method of claim 13, wherein the plurality of physical storage volumes comprises a plurality of hard disk drives without head position motors, wherein the data access system includes at least one head position motor for positioning heads in the plurality of hard disk drives, and wherein providing the real-time write control comprising:

controlling operation of the head position motor.

16. A data access system for storing data to a plurality of physical storage volumes, the data access system comprising:

processing circuitry configured to:

identify first data for storage on the plurality of physical storage volumes, wherein each of the plurality of physical storage volumes corresponds to respective ones of a plurality of data channels and a plurality of control channels;

segment the first data into a plurality of data segments corresponding to respective ones of the plurality of data channels;

transfer the plurality of data segments as respective bit streams over the respective ones of the plurality of data channels to the respective ones of the plurality of physical storage volumes; and provide real-time write control to the plurality of physical storage volumes over respective ones of the plurality of control channels, wherein the real-time write control directs a process for how the plurality of physical storage volumes write the plurality of data segments;

wherein the plurality of physical storage volumes includes a plurality of hard disk drives without heads; and wherein the data access system includes a head position motor, and at least one head that is coupled to the head position motor and that is configured for writing data to the plurality of hard disk drives.

17. The data access system of claim 16, wherein the plurality of physical storage volumes further includes a plurality of hard disk drives and wherein the real-time write control includes signaling for controlling a disk rotation motor and a head position motor in each of the plurality of hard disk drives.

18. The data access system of claim 17, wherein the plurality of physical storage volumes comprises a plurality of hard disk drives without disk rotation motors, wherein the data access system includes at least one disk rotation motor for rotating disks in the plurality of hard disk drives, and wherein the processing circuitry configured to provide the real-time write control comprises:

the processing circuitry configured to control operation of the disk rotation motor.

19. The data access system of claim 17, wherein the plurality of physical storage volumes comprises a plurality of hard disk drives without head position motors, wherein the data access system includes at least one head position motor for positioning heads in the plurality of hard disk drives, and wherein the processing circuitry configured to provide the real-time write control comprises:

the processing circuitry configured to control operation of the head position motor.

20. The data access system of claim 16, wherein segmenting the first data into the plurality of data segments includes performing a data protection process on the first data that results in the plurality of data segments.

\* \* \* \* \*